3,311,722
PROBE HEAD FOR STORM SEWERS AND THE LIKE
Harold L. Hammerschmidt and Kenneth J. Hutchings, Minneapolis, Minn., assignors to Automatic Control Company, St. Paul, Minn., a corporation of Minnesota
Filed Feb. 10, 1965, Ser. No. 431,600
5 Claims. (Cl. 200—61.05)

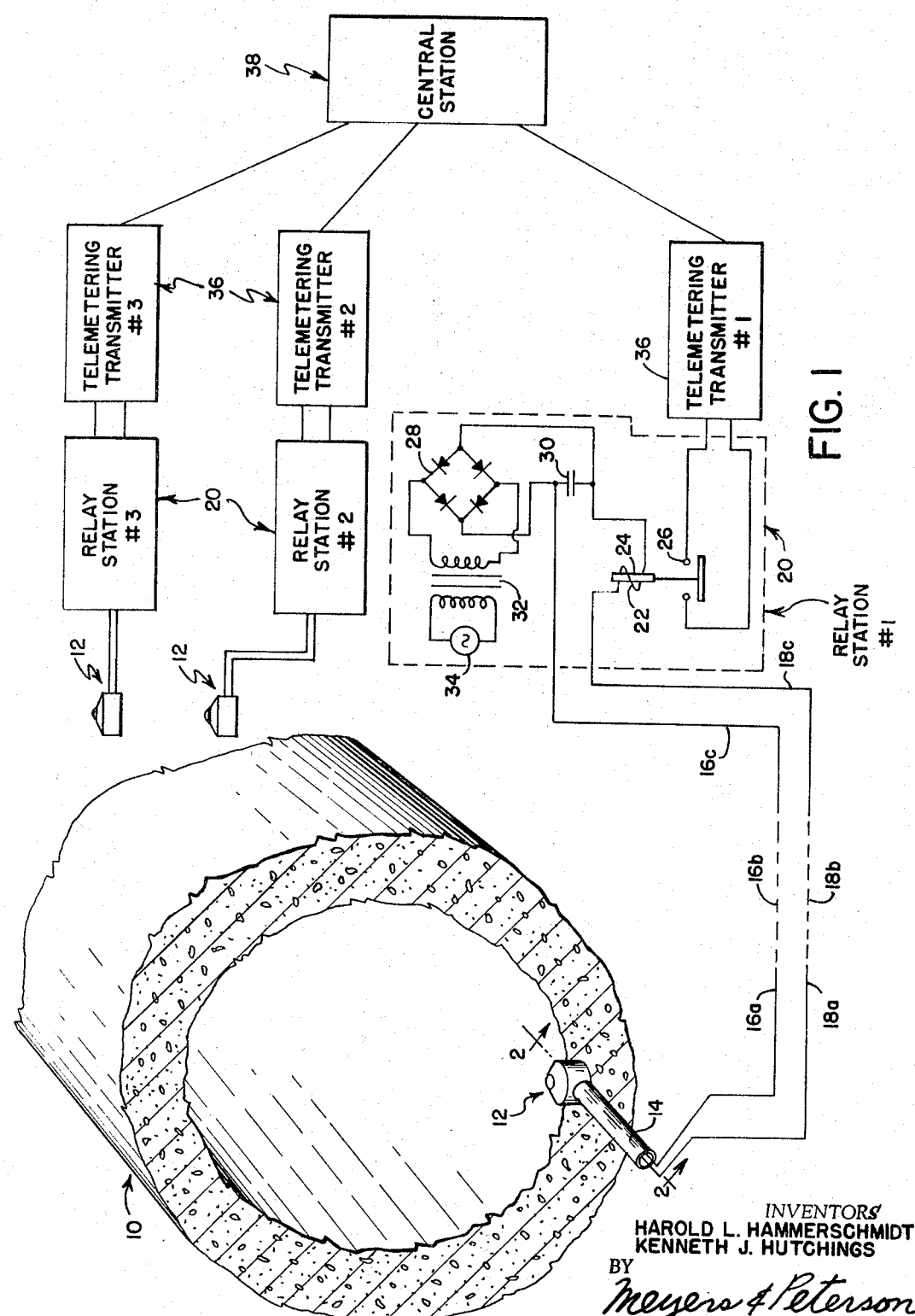

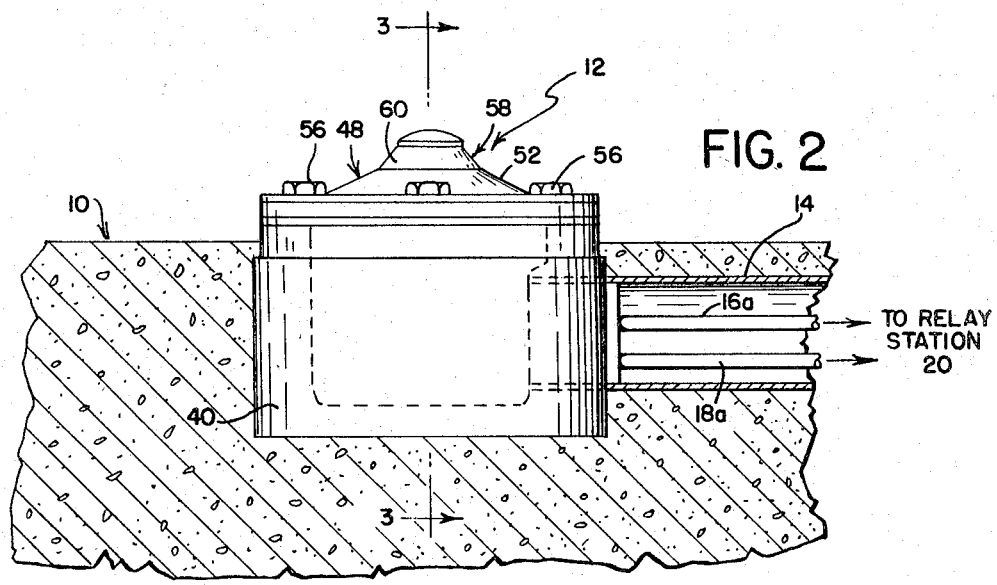
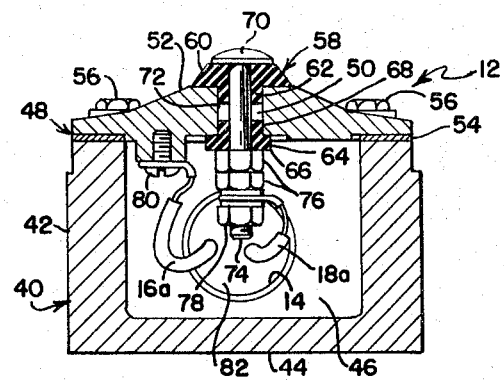

This invention relates generally to probe heads for indicating the presence of liquid or the level of liquid and pertains more particularly to a probe for use in storm sewers and the like. Modern-day storm sewer systems involve elaborate and complicated networks. In order to control properly the flow of sewage through the various branches of the network, it is essential that accurate information be telemetered to a central location or station so that the information can be analyzed. In this way, if one branch of the system is becoming overloaded, appropriate action can be taken to divert some of the sewage into other portions of the system. The present invention does not concern such systems directly but provides a probe head that will have especial utility when installed in a system of this type, although it can be used to indicate zero flow in a normally running sewer (resort being made to a reverse acting relay in such an installation) or the probe head might be mounted in the wall of the sewer pipe to indicate excessive level in a normally running sewer.

Accordingly, the invention has for one object the provision of a probe head that will not be vulnerable to damage when located in an area of high liquid flow, particularly if the liquid contains debris and rubble of various sorts, such as can be expected in a storm sewer. In conventional sensing devices that have been used rather extensively heretofore, probe rods are employed which are suspended from a suitable housing mounted above the liquid or in the region where liquid of a given height may be found at times, the level of the liquid requiring sensing in order to exercise a degree of control over the flow. Sometimes probe tips are suspended on wires from a suitable housing mounted above the liquid or the path the liquid is intended to follow. Also, pressure diaphragm type sensors have been used. It is an aim of the instant invention to obviate the shortcomings of such prior art devices because they are of a comparatively fragile character with respect to the probe head forming the subject matter of the present invention.

Still further, it is an object of the invention to provide a novel sensing head that is rugged, compact, easily assembled, of simple construction, not vulnerable to mechanical damage and which is impervious to moisture.

Yet another object of the invention is to provide a probe head that presents a very low profile, thereby further minimizing the likelihood of damage thereto by debris, such as that apt to be found in a storm sewer. Furthermore, it is an aim of the invention to provide a probe head having a housing that can be readily grouted into a concrete sewer conduit.

These and other objects and advantages of our invention will more fully appear from the following description, made in connection with the accompanying drawings, wherein like reference characters refer to the same or similar parts throughout the several views and in which:

FIGURE 1 is a perspective view, fragmentarily shown, of a storm sewer having our probe head installed therein, the view further depicting in schematic form one relay station and in block form the manner in which information is telemetered to a central station;

FIGURE 2 is a sectional view of the storm sewer taken in the direction of the line 2—2 in order to show to better advantage the external appearance of the probe head forming the subject matter of this invention, and FIGURE 3 is a sectional view taken in the direction of line 3—3 of FIGURE 2 for the purpose of illustrating the internal construction of the probe head.

Referring now in detail to FIGURE 1, a typical storm sewer 10 has been pictured rather fragmentarily. The sewer 10 has installed therein a probe head denoted generally by the reference numeral 12. Extending from the probe head 12 is a conduit 14 via which a pair of conductors 16a and 18a are brought from the head 12. More will be said hereinafter concerning the mode of attachment of these conductors 16a, 18a within the head but at the moment it will be recognized that these conductors convey information via lines 16b and 18b, which may be telephone lines, to additional conductors 16c and 18c.

The conductors 16c, 18c are associated directly with a collection point or relay station 20. The exemplary relay station 20 has located thereat a relay coil 22 provided with an armature 24 which closes a pair of normally open contacts 26 when the coil 22 is energized. D.-C. power for the relay coil 22 is furnished by way of a full-wave rectifier 28. A capacitor filter 30 smooths out the voltage pulsations or ripples. The rectifier 28 receives its power from a transformer 32 which is connected to a source of A.-C. power 34.

While only one relay coil 22 has been referred to, it will be appreciated that a plurality of such coils can be placed at a given relay station or collection point, a number of probe heads 12 there then being connected to the various relay coils. In the illustrated situation shown in FIGURE 1, only one probe head has been shown in conjunction with each relay station. Also, only three relay stations have been shown; any number of such stations might exist, depending largely upon the complexity of the storm sewer network. At any rate, it will be observed that there will be one telemetering transmitter 36 associated with each relay station 20. If a number of relay coils 22 service a number of probe heads 12, then the transmitter will be designed to handle the information, usually on a multiplexing basis. The information telemetered from the transmitters 36 is sent to a main plant or central station 38 where an appropriate telemetering receiver is located.

Describing now the probe head 12 in detail, it will be discerned that the head comprises a cup-shaped metallic housing 40 having a cylindrical side wall 42 and a horizontal bottom wall 44 providing a recess 46 which is open at the top. However, for closing the upwardly facing recess 46 there is a circular metallic cover 48 having a centrally disposed, vertically extending aperture 50 passing therethorugh. The profile or contour of the cover is such that an upwardly and inwardly sloping surface 52 is formed on the top thereof. A gasket 54 is located between the housing 40 and the cover 48. Suitable bolts 56 detachably secure the cover 48 in a fluid-tight relationship with the housing 40.

An upper insulating bushing 58 is formed with a truncated or tapered flange 60 and a cylindrical body portion 62. A lower insulating bushing 64 has a flange 66 thereon and also includes a cylindrical body portion labeled 68. As can be seen from FIGURE 3, the adjacent ends of the cylindrical portions 62, 68 are in a spaced relationship with each other. In other words, they do not abut.

Next to be referred to is a convex probe button 70 having a downwardly extending shank 72 formed with a threaded lower end 74. The probe button 70 is fabricated from suitable metal. The metal should be not only electrically conductive but should possess sufficient strength so that clamping nuts 76 when tightened will cause the probe button 70 to be pulled downwardly against the upper side of the truncated flange 60. In this way, the two bushings 58, 64 are subjected to sufficient compressive pressure so as to prevent entrance of liquid via the aperture 50.

An additional nut 78 can be mounted on the lower end of the threaded shank 72. The function of the additional nut 78 will be described in a moment. However, at this time, attention is directed to a terminal screw 80. Thus, the nut 78 serves to anchor one end of the conductor 18a whereas the screw 80 serves to anchor the end of the conductor 16a. The housing 40 is provided with a laterally directed opening 82 into which the conduit 14 extends. Consequently, the conductors 16a, 18a extend outwardly through the opening 82 into the conduit 14. It is intended that the conduit 14 be of any suitable length to carry the conductors 16a, 18a to a point from whence they can leave the storm sewer 10. As already indicated, the conductors 16a, 18a can be connected directly to lines 16b, 18b which may be in the form of telephone lines.

Having presented the foregoing information, the manner in which our probe head functions or operates should be clear and straightforward. It can be pointed out, though, that the probe button 70 with its rounded or convex upper surface serves as one electrode. The other electrode is the cover 48, more specifically, its sloping surface 52. In this regard, it will be appreciated that the bushings 58, 64 afford adequate insulation between all portions of the button 70 and said cover. Hence, when liquid bridges the space or area between the convex surface on the upper face of the button 70 and the surface 52 on the cover 48, such action will complete an electrical path through the relay coil 22 at the station 20. This causes the relay to pick up, thereby closing the normally open contacts 26. It has already been explained that the relay coil 22 is connected to the rectifier 28. When the contacts 26 are closed, this conveys information to the transmitter 36 that water is flowing in the sewer 10. The sewer 10 may be only one branch of a complicated network of such sewers. When the transmitter 36 sends suitable signals to the central station 38, then the operator at the station 38 is apprised of the flow of sewage to the sewer 10. Appropriate action can then be taken, particularly if the sewer 10 represents a branch that normally only carries overflow sewage. As already indicated, the particular system is not important to a practicing of the present invention. Of course, it will be recognized that the relatively low profile, as visibly apparent from FIGURE 2, of our probe head 12 renders it particularly suitable for installation in storm sewers and the like where debris and other material might otherwise strike the head and damage the parts thereof, thus obviating a weakness of prior art probe devices.

It will, of course, be understood that various changes may be made in the form, details, arrangements and proportions of the parts without departing from the scope of our invention as set forth in the appended claims.

What is claimed:

1. A probe head comprising a cup-shaped housing providing an upwardly facing recess, a metallic cover member detachably secured to said housing so as to close said recess, said cover member having a centrally disposed aperture extending vertically therethrough, a metallic probe button having a shank extending downwardly through said aperture into said recess, said button also having an exposed electrically conductive surface thereon, and means underlying said button for electrically insulating said button from said cover member and for supporting said button such that its exposed surface is spaced entirely above said cover member and at least a portion of said exposed surface being convex, said insulating means including a bushing having a cylindrical portion extending downwardly into said aperture in an encircling relation with said shank and also having a downwardly and outwardly sloping surface extending from the edge of said button to said cover member.

2. A probe head in accordance with claim 1 in which said cover member slopes upwardly to said bushing.

3. A probe head comprising a cup-shaped housing having an upwardly directed cylindrical side wall and a horizontal bottom wall forming an upwardly facing recess, a circular metallic cover member of a diameter to overlie the upper edge of said cylindrical wall, said cover member having a centrally disposed aperture extending vertically therethrough and having a top surface sloping upwardly and inwardly from its periphery toward said aperture, a first insulator bushing having a truncated flange confronting the top marginal portion of said cover member circumjacent said aperture and having a cylindrical portion extending downwardly into said aperture, a second insulator bushing having a flange confronting the bottom marginal portion of said cover member circumjacent said aperture and having a cylindrical portion extending upwardly into said aperture, said bushings terminating in a spaced relationship with respect to each other, a metallic probe button having a convex upper surface and a flat bottom surface confronting the top of said truncated flange, the periphery of said button being coextensive with the upper side of said truncated flange, said button having a shank extending downwardly through both of said bushings, and threaded means adjacent the lower end of said shank acting against the underside of the flange of said second bushing to exert a compressive force against the upper side of said truncated flange via said button.

4. A probe head in accordance with claim 3 including additional means at the lower end for connecting an electrical conductor to said shank, and means between said shank and cylindrical wall for connecting a second conductor to the lower side of said cover member.

5. A probe head comprising a cup-shaped housing providing an upwardly facing recess, a metallic cover member detachably secured to said housing so as to close said recess, said cover member having a centrally disposed aperture extending vertically therethrough, a metallic probe button having a shank extending downwardly through said aperture into said recess, said button projecting slightly above said cover member so as to provide an exposed electrically conductive convex upper surface, and means underlying said button for electrically insulating said button from said cover member, said insulating means including a bushing having a flange underlying said button and a cylindrical portion extending downwardly into said aperture in an encircling relation with said shank, said flange being truncated so as to provide a downwardly and outwardly sloping surface extending from the edge of said button to said cover member, said cover member sloping upwardly to said flange.

References Cited by the Examiner

UNITED STATES PATENTS

| 2,067,440 | 1/1937 | Finney | 200—61.05 X |
| 2,650,343 | 8/1953 | Thompson | 200—61.05 X |
| 2,839,742 | 6/1958 | Sumner | 200—61.05 X |
| 2,968,688 | 1/1961 | Skinner | 200—61.04 X |

BERNARD A. GILHEANY, *Primary Examiner.*

R. K. SCHAEFER, *Examiner.*

R. N. ENVALL, JR., *Assistant Examiner.*